Patented Aug. 11, 1936

2,050,493

UNITED STATES PATENT OFFICE 2,050,493

COMPOSITIONS OF MATTER CONTAINING AMMONIA AND POTASSIUM NITRATE, THEIR PREPARATION AND USE

Charles K. Lawrence, Syracuse, N. Y., and Edward W. Harvey, Highland Park, N. J., assignors to Atmospheric Nitrogen Corporation, New York, N. Y., a corporation of New York No Drawing. Application January 21, 1933, Serial No. 652,918

10 Claims. (Cl. 71—9)

This invention relates to new compositions of matter comprising a potassium salt such as potassium nitrate or potassium chloride and ammonia, to processes for their preparation, to methods for the transportation of potassium salts such as potassium nitrate, potassium chloride and ammonia, and to the production of fertilizers employing said compositions.

The methods for the fixation of atmospheric nitrogen recently developed make available from this source large amounts of ammonia for industrial purposes and particularly for the production of fertilizers. This ammonia may be oxidized to nitrogen oxides and the oxides absorbed in potassium bases such as potassium carbonate or potassium hydroxide to produce potassium nitrate. There are, therefore, available at synthetic ammonia plants the two products, ammonia and potassium nitrate.

The marketing of these separate products is, however, attended by difficulties and expensive operations. The ammonia may be obtained either in the form of liquid ammonia or of aqua ammonia. The liquid ammonia has relatively high vapor pressures at ordinary temperatures and the aqua ammonia contains a considerable proportion of water, both of which make the transportation of large quantities of ammonia in these forms difficult and expensive. With respect to the potassium nitrate, this material is usually produced in aqueous solution and, in order to obtain it as a solid, expensive evaporations must be carried out.

It is frequently desirable to prepare fertilizers containing both phosphorus and nitrogen, which may be done by treating monocalcium acid phosphate materials, such as superphosphate or triple superphosphate, with ammonia. When relatively large proportions of ammonia are added to a superphosphate material, however, the ammonia tends to cause water soluble and citrate soluble $P_2O_5$ in the superphosphate to revert to a citrate insoluble form which is not considered available as plant food. It is often desirable, however, to prepare fertilizers containing a higher proportion of nitrogen than may be obtained by treating a superphosphate material with ammonia alone in an amount which does not cause excessive reversion of the $P_2O_5$.

It is, accordingly, an object of this invention to provide compositions of matter comprising the nitrogen-containing products readily available at synthetic ammonia plants (potassium nitrate and ammonia), which compositions may be conveniently transported as liquids of low vapor pressure containing a relatively high percentage of nitrogen. It is further an object of this invention to provide a process for the economical preparation for transportation of potassium nitrate and ammonia in the form of liquid compositions containing these valuable ingredients. Another object of the invention is to provide a process for the production of fertilizers which may contain a relatively high proportion of nitrogen by treating a monocalcium acid phosphate material, for example, superphosphate, triple superphosphate or mixtures containing the same, with a liquid composition comprising potassium nitrate and ammonia. Further objects of this invention are: to provide ammoniacal solutions containing potassium chloride having relatively low vapor pressures yet which contain relatively large amounts of valuable fertilizer ingredients; to provide a process for the economical transportation of ammonia and potassium chloride in the form of liquid compositions containing these ingredients; and to provide a process for the production of fertilizers containing potash, nitrogen and phosphorus by the treatment of a superphosphate with said liquid compositions.

Potassium nitrate dissolves in water to the extent of about 11.7 parts of potassium nitrate to 88.3 parts of water at 0° C., i. e., a saturated solution at this temperature contains about 11.7% potassium nitrate. (Throughout this specification and in the claims, the term "parts" refers to parts by weight.) As ammonia is dissolved in the water, however, the amount of potassium nitrate which may be dissolved rapidly decreases. For example, a saturated solution of potassium nitrate in 25% aqua ammonia (a solution of ammonia in water containing 25% $NH_3$) at 0° C. contains about 5% $KNO_3$. We have discovered, however, that for concentrations of aqua ammonia of about 25% $NH_3$ and higher the solubility of the potassium nitrate increases with increase in the concentration of the aqua ammonia. Thus, at 0° C. a saturated solution of potassium nitrate in 50% aqua ammonia contains about 6.5% $KNO_3$, in 75% aqua ammonia contains about 7% $KNO_3$, and in anhydrous liquid ammonia contains about 9% $KNO_3$. A solution of potassium nitrate in 50% aqua ammonia saturated at 22° C. contains about 10% $KNO_3$ and in anhydrous liquid ammonia at 30° C. contains somewhat less than 15% $KNO_3$.

A solution of potassium chloride in water saturated at 0° C. contains about 21.8 parts of KCl for every 78.2 parts of water, but we have discovered that as ammonia is dissolved in the water in increasing amounts, the solubility of the potassium chloride decreases. Thus at 0° C. a saturated solution of potassium chloride in 25% aqua ammonia contains about 8.2% KCl and in 50% aqua ammonia about 3.8% KCl, and in anhydrous liquid ammonia less than 0.5% KCl.

In terms of the parts of potassium nitrate or potassium chloride for every 1 part of basic ammonia contained in saturated solutions of these salts at 0° C., we have found that this ratio for 25% aqua ammonia is about 0.21 parts $KNO_3$ and 0.36 parts KCl to 1 part $NH_3$; for 50% aqua ammonia is about 0.14 parts $KNO_3$ and 0.08 parts KCl to 1 part $NH_3$; and for 75% aqua ammonia and upwards to anhydrous liquid ammonia is about 0.10 parts $KNO_3$ and less than about 0.02 part KCl to 1 part $NH_3$. In terms of $K_2O$, which is the basis used for calculating the potassium content of fertilizer ingredients, a solution of potassium nitrate in 25% aqua ammonia saturated at 0° C., contains about 0.10 parts $K_2O$ to every 1 part of $NH_3$ and a similarly saturated solution of potassium chloride contains about 0.23 parts $K_2O$ to every 1 part of $NH_3$.

It may thus be seen that the ratio of potassium nitrate or potassium chloride to basic ammonia in the saturated ammoniacal solutions, decreases with increasing concentration of the aqua ammonia up to anhydrous liquid ammonia.

Accordingly, aqueous solutions of potassium nitrate or potassium chloride in which the ratio of water to ammonia is about 25 to 55 parts of ammonia for every 100 parts of water and which are substantially saturated with potassium nitrate or potassium chloride at a temperature above about 0° C., are particularly desirable both for transporting the ammonia and potassium nitrate and for addition to superphosphate materials to form fertilizers. Such solutions in which the ratios of ammonia to water correspond to about 20% to about 35% aqua ammonia, may be used with particular advantage for treating superphosphates, since such solutions contain a relatively high proportion of non-alkaline fertilizer ingredients (potassium and in the case of potassium nitrate solutions, nitrate nitrogen) to basic ammonia and thus permit of adding to the superphosphate relatively large proportions of potash with or without nitrogen without the addition of an excessive amount of ammonia such as would cause undue reversion of the $P_2O_5$.

We have found that changes in temperature cause relatively little precipitation of solid from the solutions of potassium nitrate and chloride of this invention and thus they may be readily transported, utilized in spraying equipment, etc. without difficulties arising from the deposition of solid materials due to cooling of the solutions. For the transportation of potassium nitrate or potassium chloride and ammonia, solutions of potassium nitrate in ammoniacal liquids substantially saturated with potassium nitrate at temperatures between about —30° C. and 30° C., are of value since they may be transported and used without presenting serious difficulties due to the separation of solid from the liquid under ordinary atmospheric conditions.

The use of solutions of potassium nitrate or chloride in aqua ammonia as a means for the transportation of potassium salts and ammonia is of advantage because of the increased amount of valuable fertilizer ingredients in such solutions as compared with an aqua ammonia of a corresponding concentration. Furthermore, by shipping and storing the potassium salts in the form of the ammoniacal solutions of this invention the difficulties in handling and transporting the solid crystalline salts caused by the tendency of these materials to cake together, frequently necessitating a disintegration of the caked mass, are obviated. This invention, therefore, includes a transportable package comprising a container and an ammoniacal liquid containing potassium nitrate or chloride dissolved therein, particularly a solution of potassium nitrate or chloride in aqua ammonia of a concentration between about 20 to 35 parts of $NH_3$ to 80 to 65 parts of water.

Potassium nitrate or chloride and ammonia may be prepared for transportation and/or use in the preparation of fertilizers in the form of the liquid compositions of this invention by admixing the dry solid potassium salt with anhydrous liquid ammonia or with aqua ammonia. Ammonia either in the form of gaseous ammonia, of liquid anhydrous ammonia, or of aqua ammonia may be mixed with solutions or slurries of potassium nitrate or chloride to form the desired composition. Furthermore, in reacting nitrogen oxides or nitric acid with a potassium base or potassium chloride to form potassium nitrate any desired acidity of the reaction mixture may be maintained and the acidic product treated with ammonia to form a potassium nitrate-ammonia composition of this invention. Such a procedure obviates the necessity of carefully controlling the proportions of acid and base used in the preparation of the potassium nitrate or of carefully neutralizing the potassium nitrate product to avoid the presence of free acid in the product such as is required where solid potassium nitrate is recovered and shipped as such. The ammonia added to the acid solution reacts with the acid present to form ammonium nitrate which may, therefore, be present in the product in a greater or lesser amount. The ammonium nitrate itself is a valuable fertilizer ingredient.

The following examples are illustrative of methods for preparing the solutions of this invention and of utilizing them in the preparation of fertilizers. The proportions of materials used are given in parts by weight.

*Example I.*—A substantially anhydrous liquid composition may be prepared by dissolving about 9 parts of dry solid potassium nitrate in about 90 parts of liquid anhydrous ammonia. Solid potassium nitrate does not crystallize out from this solution at temperatures above about 0° C.

*Example II.*—About 12 parts of dry solid potassium nitrate are mixed with about 88 parts of liquid anhydrous ammonia and about 88 parts of water. The proportions of potassium nitrate and ammonia used in preparing the composition of this example would form a slurry which at 0° C. would contain about 3½ parts of undissolved potassium nitrate. With the indicated proportions of water present, however, a liquid composition which does not salt out at temperatures above about 0° C. is obtained.

A composition similar to the above may be prepared by dissolving about 12 parts of dry potassium nitrate in about 175 parts of 50% aqua ammonia.

*Example III.*—About 26½ parts of an aqueous solution containing about 6½ parts of potassium nitrate and 20 parts of water are mixed with about 100 parts of 30% aqua ammonia. The resulting solution will not salt out at temperatures above about 0° C. It contains about 33⅓ parts of $NH_3$ for every 100 parts of water. A similar composition may be prepared by dissolving 6½ parts of potassium nitrate in about 120 parts of 25% aqua ammonia.

*Example IV.*—About 4½ parts of potassium nitrate are dissolved in about 40 parts of liquid anhydrous ammonia and the resulting solution mixed with the following ingredients:

About 890 parts of superphosphate (18% $P_2O_5$), about 290 parts of manure salts (20% $K_2O$), about 125 parts of ammonium sulfate, about 650 parts of an inert filler (sand). The potassium nitrate-ammonia solution may be sprayed onto the solid ingredients while they are being admixed in a rotary mixer or the solid ingredients may first be mixed and then treated with the solution. The resulting fertilizer mixture is in excellent physical condition immediately after ammoniation and also after cooling to atmospheric temperature. It contains 3% N, 8% $P_2O_5$ and 3% $K_2O$.

*Example V.*—About 85 parts of a solution containing approximately 6% potassium nitrate, 47% ammonia and 47% water, which may be prepared, for example, by dissolving potassium nitrate in 50% aqua ammonia, is mixed with the following materials:

About 890 parts of superphosphate, about 125 parts of ammonium sulfate, about 115 parts of potassium sulfate, about 785 parts of inert filler (sand). The resulting fertilizer product contains about 3% N, 8% $P_2O_5$ and 3% $K_2O$.

*Example VI.*—About 8.2 parts of dry solid potassium chloride are dissolved in about 91.8 parts of 25% aqua ammonia. The resulting liquid composition which does not salt out a solid phase at temperatures above about 0° C., contains about 33½ parts of $NH_3$ for every 100 parts of water. It may be utilized in the preparation of a fertilizer by spraying it upon superphosphate in the proportions of about 100 parts of the solution to about 1000 parts of superphosphate. The superphosphate, may if desired, be mixed with ammonium sulfate and/or potassium chloride or sulfate before, after or simultaneously with the treatment with the ammoniacal liquid.

While the above examples are given as illustrative of this invention, numerous modifications and changes may be made in the particular compositions disclosed and methods of employing them in the production of fertilizers. If desired, additional materials, such as ammonium phosphate, ammonium sulfate, ammonium nitrate, potassium chloride, sodium nitrate, calcium nitrate, etc., or any two or more of these materials which in themselves are valuable fertilizers, may be incorporated with the potassium nitrate-ammonia or potassium chloride-ammonia solutions before they are added to the superphosphate material or they may be incorporated with the phosphate material as in Examples IV and V, before, after or simultaneously with the treatment with the potassium nitrate-ammonia or potassium chloride-ammonia compositions. For example, a solution may be prepared for use in treating a superphosphate by dissolving potassium nitrate in a liquid composition comprising ammonium nitrate, ammonia and water. Such a solution may contain about 5 parts of $KNO_3$, about 55 parts of $NH_4NO_3$ and about 20 parts each of water and ammonia, which solution does not salt out at temperatures above about 30° C. This solution is equivalent to dissolving potassium nitrate in a liquid containing about 58% ammonium nitrate, 21% ammonia and 21% water to obtain a liquid composition containing about 5% potassium nitrate. Similarly, a solution containing potassium chloride and ammonium nitrate may be prepared for use in treating a superphosphate by dissolving about 3 parts KCl and 60 parts $NH_4NO_3$ in about 37 parts of a 50% aqua ammonia.

When in the appended claims reference is made to a solution saturated with potassium nitrate or potassium chloride at a given temperature, it is intended to refer to a solution which contains an amount of potassium nitrate or chloride such that it does not salt out a solid phase containing the potassium salt at temperatures above the given temperature but which, upon cooling to a lower temperature, deposits solid potassium nitrate or chloride or a solid comprising the same.

We claim:

1. As a new composition of matter a liquid comprising ammonia, water and potassium nitrate in the proportions of from substantially more than 25 parts to about 55 parts of ammonia for every 100 parts of water and substantially saturated with potassium nitrate at a temperature within the range of about —30° C. to 30° C.

2. As a new composition of matter a liquid comprising ammonia, water and potassium nitrate in the proportions of from substantially more than 25 parts to about 55 parts of ammonia for every 100 parts of water and substantially saturated with potassium nitrate at a temperature above about 0° C.

3. A process for the preparation for transportation of ammonia and potassium nitrate which comprises preparing a liquid composition containing potassium nitrate, ammonia and water in the proportions of from substantially more than 25 parts to about 55 parts of ammonia for every 100 parts of water and substantially saturated with potassium nitrate at a temperature between about —30° C. and 30° C.

4. A method for the transportation of ammonia and potassium nitrate which comprises forming a liquid mixture of potassium nitrate, ammonia and water containing from substantially more than 25 parts to about 55 parts of ammonia for every 100 parts of water and substantially saturated with potassium nitrate at a temperature between about —30° C. and 30° C. and then transporting said liquid.

5. A method for the transportation of ammonia and potassium nitrate which comprises preparing a solution of potassium nitrate in an aqueous liquid containing from substantially more than 25 parts to about 55 parts of ammonia for every 100 parts of water and then transporting said solution.

6. As a new article of manufacture a transportable package comprising a container and a liquid composition containing ammonia, water, and potassium nitrate in the proportions of from substantially more than 25 parts to about 55 parts of ammonia for every 100 parts of water and substantially saturated with potassium nitrate at a temperature between about —30° C. and 30° C.

7. A process for producing a fertilizer which comprises treating an acidic fertilizer material with an aqueous liquid composition containing substantially more than 25 parts of ammonia for every 100 parts of water and substantially saturated between —30° C. and 30° C. with potassium nitrate.

8. A process for producing a fertilizer which comprises treating a superphosphate material with an aqueous ammoniacal solution of potassium nitrate, said solution containing from substantially more than 25 parts to about 55 parts of ammonia for every 100 parts of water and being substantially saturated with potassium nitrate at a temperature of about −30° C. to 30° C.

9. A process for producing a fertilizer which comprises treating a superphosphate material with a saturated solution of potassium nitrate in an aqueous liquid containing from substantially more than 25 parts to about 55 parts of ammonia for every 100 parts of water.

10. A process for producing a fertilizer which comprises treating a superphosphate material with an aqueous ammoniacal solution of potassium nitrate containing from substantially more than 25 parts to about 55 parts of ammonia for every 100 parts of water and substantially saturated with potassium nitrate at a temperature of above about 0° C.

CHARLES K. LAWRENCE.
EDWARD W. HARVEY.